(12) United States Patent
Matsunaga et al.

(10) Patent No.: US 11,679,332 B2
(45) Date of Patent: Jun. 20, 2023

(54) NON-TRANSITORY COMPUTER READABLE MEDIUM, INFORMATION PROCESSING METHOD, AND GAME DEVICE

(71) Applicant: CYGAMES, INC., Tokyo (JP)

(72) Inventors: Kazuya Matsunaga, Tokyo (JP); Xinpeng Huang, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/358,809

(22) Filed: Jun. 25, 2021

(65) Prior Publication Data

US 2021/0322885 A1    Oct. 21, 2021

Related U.S. Application Data

(63) Continuation of application No. PCT/JP2019/050053, filed on Dec. 20, 2019.

(30) Foreign Application Priority Data

Dec. 28, 2018    (JP) .............................. JP2018-248069

(51) Int. Cl.
*A63F 13/00*      (2014.01)
*A63F 13/69*      (2014.01)
*A63F 13/52*      (2014.01)
*A63F 13/56*      (2014.01)
*A63F 13/822*     (2014.01)

(52) U.S. Cl.
CPC .............. *A63F 13/69* (2014.09); *A63F 13/52* (2014.09); *A63F 13/56* (2014.09); *A63F 13/822* (2014.09)

(58) Field of Classification Search
CPC .................................. A63F 13/69; A63F 13/52
See application file for complete search history.

(56) References Cited

U.S. PATENT DOCUMENTS

| 2003/0058238 | A1* | 3/2003 | Doak ...................... G06T 19/00 |
| | | | 709/217 |
| 2007/0155493 | A1 | 7/2007 | Sata et al. |

(Continued)

FOREIGN PATENT DOCUMENTS

| JP | 2001-113040 A | 4/2001 |
| JP | 2007-160003 A | 6/2007 |
| JP | 2009-153559 A | 7/2009 |

OTHER PUBLICATIONS

Mario 64—"Sleeping" https://youtu.be/7OtW-LLZ2OA (Year: 2016).*

(Continued)

*Primary Examiner* — David L Lewis
*Assistant Examiner* — Eric M Thomas
(74) *Attorney, Agent, or Firm* — Osha Bergman Watanabe & Burton LLP

(57) ABSTRACT

A non-transitory computer readable medium stores a program causing a computer to execute: displaying a player object on a virtual game space; causing the player object to perform a first motion when a first operation has been input; causing the player object to perform a special motion when the player object is not performing the first motion and an appearance of the player object satisfies a predetermined condition, irrespective of an input operation; and changing the appearance of the player object when the player object has performed the special motion.

10 Claims, 20 Drawing Sheets

(56) References Cited

U.S. PATENT DOCUMENTS

2012/0218301 A1* 8/2012 Miller .................... G06Q 30/02
 345/633
2013/0127980 A1* 5/2013 Haddick ................. G06F 3/013
 348/14.08

OTHER PUBLICATIONS

International Search Report issued in PCT/JP2019/050053 dated Mar. 17, 2020 (7 pages).
Written Opinion of the International Searching Authority issued in PCT/JP2019/050053 dated Mar. 17, 2020 (4 pages).
Office Action issued in the counterpart Japanese Patent Application No. 2018-248069, dated Apr. 2, 2019 (8 pages).

* cited by examiner

| STATUS | CATEGORY | INVOCATION CONDITION | | | PRIORITY | SPECIAL MOTION |
|---|---|---|---|---|---|---|
| USING SWORD | CATEGORY 1 | INTERMEDIATE DISTANCE OR LONGER | HP LESS THAN 40% | | LOW | DEEP BREATH |
| | | | | | | SMALL BREATH OUT |
| | CATEGORY 2 | SHORTER THAN INTERMEDIATE DISTANCE | | | | REGRASP SWORD |
| | CATEGORY 3 | ALL DISTANCES | | | | SWING ARM AROUND |
| | CATEGORY 4 | IN GRASS | | | INTER-MEDIATE | PUSH ASIDE GRASS |
| | CATEGORY 5 | INTERMEDIATE DISTANCE OR LONGER | HP GREATER THAN OR EQUAL TO 80% | AFTER THREE CONSECUTIVE ATTACKS | | SWING SWORD AROUND |
| | CATEGORY 6 | AFTER COLLISION WITH WALL | HP LESS THAN 80% | AFTER STANDING UP | | HEAD SPINNING |
| | CATEGORY 7 | INTERMEDIATE DISTANCE OR LONGER | HP LESS THAN 80% | AFTER STANDING UP | | WIPE FACE |
| | | | | | | PAIN |
| | CATEGORY 8 | ASCEND SLOPE | | | | PUT HANDS ON FLOOR |
| | CATEGORY 9 | INTERMEDIATE DISTANCE OR LONGER | DEGREE OF STAINING OF COSTUME GREATER THAN OR EQUAL TO THRESHOLD | | | REMOVE DUST |
| | CATEGORY 10 | PASSING THROUGH AREA WITH FALLING ROCKS | | | HIGH | AVOID FALLING ROCKS |
| | CATEGORY 11 | INTERMEDIATE DISTANCE OR LONGER | DEGREE OF STAINING OF SWORD GREATER THAN OR EQUAL TO THRESHOLD | | | SHAKE OFF BLOOD ON SWORD |
| GUARDING | CATEGORY 12 | ALL DISTANCES | | | LOW | SWING ARM AROUND |
| | | | | | | REGRASP SWORD |
| | CATEGORY 13 | INTERMEDIATE DISTANCE OR LONGER | MOVING BACK | | | LOOK BACK |
| | CATEGORY 14 | SHORTER THAN INTERMEDIATE DISTANCE | IMMEDIATELY AFTER GUARDING | | | LATERAL MOVEMENT |
| | CATEGORY 15 | INTERMEDIATE DISTANCE OR LONGER | HP GREATER THAN OR EQUAL TO 80% | AFTER THREE CONSECUTIVE ATTACKS | INTER-MEDIATE | SWING SWORD AROUND |
| | CATEGORY 16 | IMMEDIATELY AFTER GUARDING | | | | SHAKE HEAD |
| | | | | | | RESET SHIELD IN POSITION |
| | CATEGORY 17 | INTERMEDIATE DISTANCE OR LONGER | DEGREE OF STAINING OF SWORD GREATER THAN OR EQUAL TO THRESHOLD | | HIGH | SHAKE OFF BLOOD ON SWORD |

FIG.7

| DEGREE OF STAINING | DISPLAY MODE OF SWORD |
|---|---|
| LESS THAN FIRST THRESHOLD | NO STAINING |
| GREATER THAN OR EQUAL TO FIRST THRESHOLD AND LESS THAN SECOND THRESHOLD | SMALL STAINING |
| GREATER THAN OR EQUAL TO SECOND THRESHOLD AND LESS THAN THIRD THRESHOLD | INTERMEDIATE STAINING |
| GREATER THAN OR EQUAL TO THIRD THRESHOLD | LARGE STAINING |

FIG.11A

| CONDITION | CHANGE VALUE OF DEGREE OF STAINING |
|---|---|
| ATTACK HITS ONCE | 5 |
| ATTACK HITS TWICE | 12 |
| ATTACK HITS THREE TIMES | 20 |
| SHAKE OFF BLOOD ON SWORD | −50 |

FIG.11B

| DEGREE OF STAINING | DISPLAY MODE OF COSTUME |
|---|---|
| 0~99 | DISPLAYED IN ACCORDANCE WITH DEGREE OF STAINING |

FIG.12A

| CONDITION | CHANGE VALUE OF DEGREE OF STAINING |
|---|---|
| DAMAGED (FALL) | 20 |
| AVOID | 10 |
| REMOVE DUST | −10 × 3 |

FIG.12B

NON-TRANSITORY COMPUTER READABLE MEDIUM, INFORMATION PROCESSING METHOD, AND GAME DEVICE

CROSS REFERENCE TO RELATED APPLICATIONS

This application is a continuation application of International Application No. PCT/JP2019/050053, filed on Dec. 20, 2019, which claims priority to Japanese Patent Application No. 2018-248069, filed on Dec. 28, 2018, the entire contents of which are incorporated by reference herein.

BACKGROUND ART

Technical Field

The present invention relates to information processing programs, information processing methods, and game devices.

Action games of the type in which a player character and an enemy character are disposed in a virtual game space have hitherto been known. In this type of action game, a player character is controlled to take actions in the game space according to operations of a controller by a player.

Furthermore, action games are configured such that the player character is controlled to perform a predetermined waiting motion while the player is not operating the controller (e.g., Patent Literature 1).

CITATION LIST

Patent Literature

Patent Literature 1: JP 2009-153559 A

SUMMARY OF INVENTION

Technical Problem

However, the waiting motion disclosed in Patent Literature 1 is merely an action that makes up for a period during which the player is not operating the controller, which might result in a lack of the sense of reality.

It is an object of the present invention to provide an information processing program, an information processing method, and a game device that make it possible to improve the sense of reality.

Solution to Problem

In order to solve the problem described above, an information processing program causes a computer to function as: an operation-based-action control unit that causes a player object disposed in a virtual game space to perform a specific motion corresponding to a specific operation in the case where the specific operation has been input; a special-action control unit that causes the player object to perform a special motion in the case where the player object is not performing the specific motion and the appearance of the player object satisfies a predetermined condition, irrespective of an operation that is input; and an appearance control unit that is capable of changing the appearance of the player object in the case where the player object has performed the special motion.

Furthermore, a parameter may be set concerning the appearance of the player object, the appearance control unit may change the value of the parameter in accordance with motions of the player object, including the specific motion and the special motion, and may change the appearance of the player object in accordance with the value of the parameter, and the predetermined condition may at least include a condition that the value of the parameter is greater than or equal to a threshold.

Furthermore, a change value of the parameter may be set for each motion of the player object, and in the case where the player object has performed a motion for which a change value of the parameter is set, the appearance control unit may change the value of the parameter according to the change value set for that motion.

Furthermore, parameters may be set individually for a plurality of regions of the appearance of the player object, change values of the parameters for the regions that are relevant may be set for motions of the player object, and the appearance control unit may change the values of the parameters for the regions that are relevant in accordance with the motions of the player object.

Furthermore, the operation-based-action control unit may cause the player object to perform a predetermined motion corresponding to a predetermined operation that is different from the specific operation in the case where the predetermined operation has been performed, and the special-action control unit may be capable of causing the player object to perform the special motion together with the predetermined motion.

In order to solve the problem described above, an information processing method includes: a step of causing a player object disposed in a virtual game space to perform a specific motion corresponding to a specific operation in the case where the specific operation has been input; a step of causing the player object to perform a special motion in the case where the player object is not performing the specific motion and the appearance of the player object satisfies a predetermined condition, irrespective of an operation that is input; and a step in which it is possible to change the appearance of the player object in the case where the player object has performed the special motion.

In order to solve the problem described above, a game device includes: an operation-based-action control unit that causes a player object disposed in a virtual game space to perform a specific motion corresponding to a specific operation in the case where the specific operation has been input; a special-action control unit that causes the player object to perform a special motion in the case where the player object is not performing the specific motion and the appearance of the player object satisfies a predetermined condition, irrespective of an operation that is input; and an appearance control unit that is capable of changing the appearance of the player object in the case where the player object has performed the special motion.

Effects of Disclosure

The present invention makes it possible to improve the sense of reality.

BRIEF DESCRIPTION OF DRAWINGS

FIG. 7 is a figure for explaining example special motions of the player character.

FIG. 11A is a figure for explaining the relationship between the degree of staining and the display mode of the sword.

FIG. 11B is a figure for explaining change values of the degree of staining of the sword.

FIG. 12A is a figure for explaining the relationship between the degree of staining and the display mode of the costume.

FIG. 12B is a figure for explaining change values of the degree of staining of the costume.

DESCRIPTION OF EMBODIMENTS

An aspect of an embodiment of the present invention will be described below in detail with reference to the accompanying drawings. The dimensions, materials, other specific numerals, etc. given in this embodiment are merely examples for facilitating understanding and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
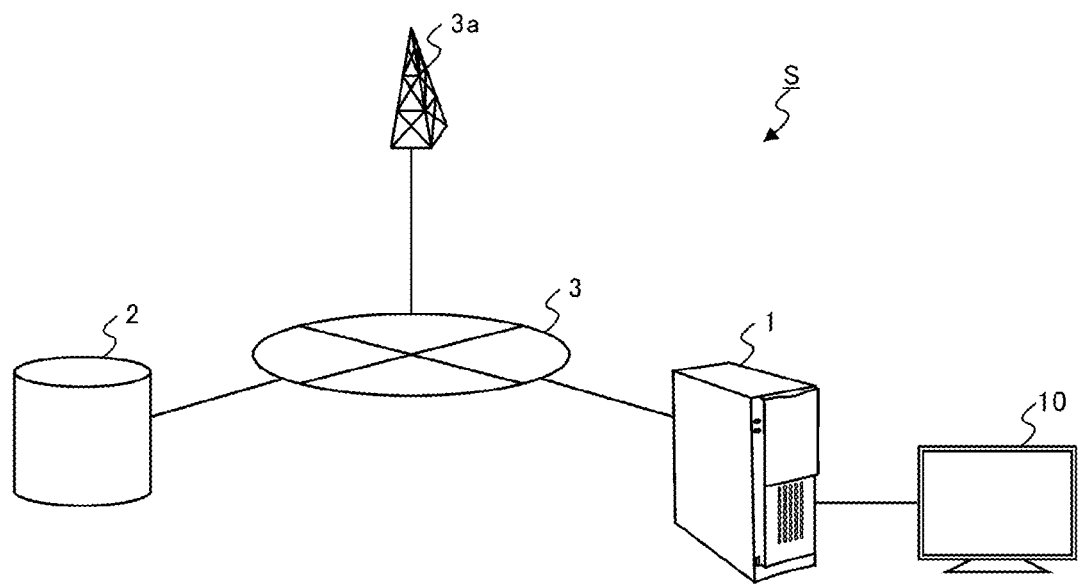
FIG. 1 is an explanatory illustration schematically showing the configuration of an information processing system.

FIG. 1 is an explanatory illustration schematically showing the configuration of an information processing system S. The information processing system S is what is called a client-server system including a game device 1, a server 2, and a communication network 3 having a communication base station 3a.

The game device 1 realizes a battle game in which a player character combats an enemy character. Examples of the game device 1 include a special game appliance for playing the game, a mobile phone such as a smartphone, a tablet, and a personal computer. This embodiment will be described in the context of the case where the game device 1 is implemented by a special game device. The game device 1 can be connected to a display 10 via a communication cable and controls image display on the display 10.

The game device 1 can establish communication with the server 2 via the communication network 3. Note, however, that the game device 1 need not necessarily have a communication function. Furthermore, although the display 10 is provided separately from the display 10, the display 10 may be included in the game device 1.

The server 2 is communicatively connected to a plurality of game devices 1. The server 2 accumulates various kinds of information for each player who plays the game. Furthermore, the server 2 updates the accumulated information on the basis of operations input from the game devices 1.

The communication base station 3a is connected to the communication network 3 and sends information to and receives information from the game devices 1 in a wireless manner. The communication network 3 is implemented by a mobile phone network, an Internet network, a local area network (LAN), a special circuit, or the like, and realizes wireless or wired communication connection between the game devices 1 and the server 2.

(Hardware Configuration of Game Device 1)

Figure 2:
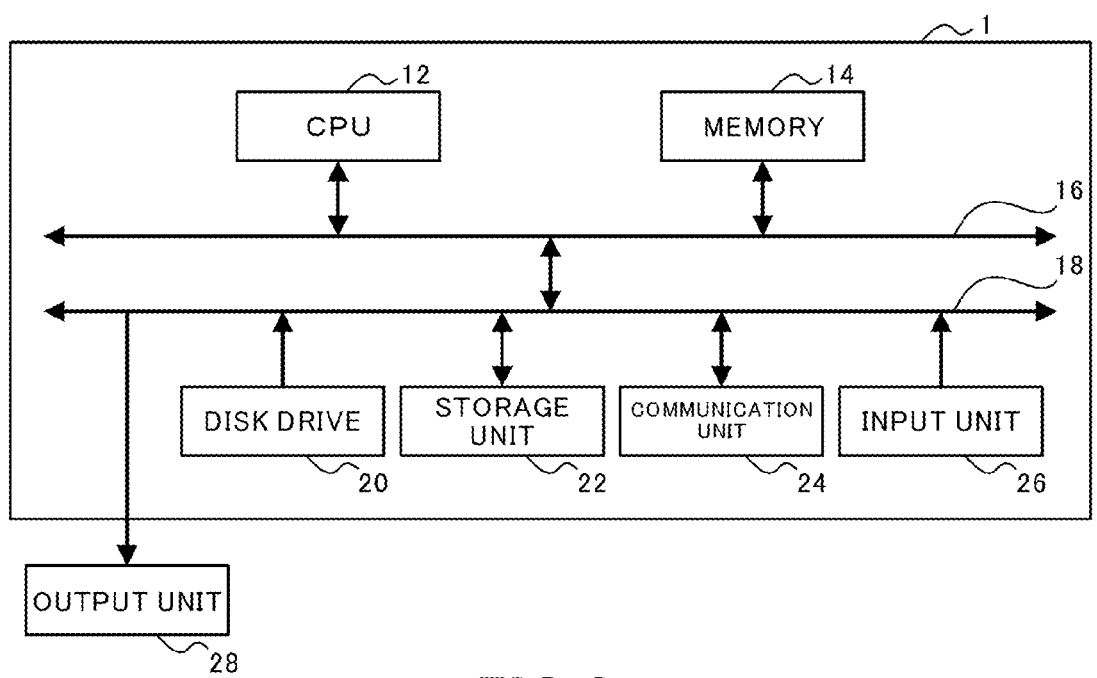
FIG. 2 is a diagram for explaining the hardware configuration of a game device.

FIG. 2 is a diagram showing the hardware configuration of the game device 1. As shown in FIG. 2, the game device 1 is configured to include a central processing unit (CPU) 12, a memory 14, a bus 16, an input/output interface 18, a disk drive 20, a storage unit 22, a communication unit 24, and an input unit 26.

The CPU 12 runs a program stored in the memory 14 to control the proceeding of the game. The memory 14 is configured of a read only memory (ROM) or a random access memory (RAM), and stores the program and various kinds of data needed for controlling the proceeding of the game. The memory 14 is connected to the CPU 12 via the bus 16. Although it is assumed that the memory 14 is configured of a RAM in this embodiment, the memory 14 may be configured of a ROM or may be configured to include both a RAM and a ROM.

The input/output interface 18 is connected to the bus 16. The disk drive 20, the storage unit 22, the communication unit 24, and the input unit 26 are connected to the input/output interface 18.

The disk drive 20 reads a storage medium in which a game program is stored. The storage unit 22 is configured of a semiconductor memory such as a dynamic random access memory (DRAM), and stores various kinds of programs and data. In the game device 1, programs and data stored in the storage medium inserted into the disk drive 20 or stored in the storage unit 22 are loaded into the memory 14 (RAM) by the CPU 12.

The communication unit 24 is communicatively connected to the communication base station 3a in a wireless manner, and sends information to and receives information from the server 2 via the communication network 3, such as various kinds of data and programs. In the game device 1, programs, etc. received from the server 2 can be stored in the memory 14 or the storage unit 22.

The input unit 26 is configured of a unit via which player operations are input (operations are accepted), such as an analog controller, a touchscreen, buttons, a keyboard, or a mouse. Furthermore, the input unit 26 may be configured of an acceleration sensor that detects tilting or movement or a microphone that detects the player's voice. That is, the input unit 26 may include a wide variety of devices that enable the input of the player's intents in distinguishable manners. Here, a controller 30, which will be described later, is provided as the input unit 26.

Furthermore, an output unit 28 configured of the display 10 described above, a speaker, etc. is connected to the input/output interface 18. Although it is assumed here that the game device 1 does not include the output unit 28, the game device 1 may be configured to include the output unit 28.

(Game Specifics)

Next, the specifics of the game provided by the game device 1 (information processing system S) according to this embodiment will be described by using an example. In this embodiment, what is called an action roll playing game (RPG) is provided.

Figure 3A:
FIG. 3A is an illustration for explaining game specifics.

FIG. 3A is an illustration for explaining the game specifics. The player first sets the equipment (appearance) of a player character that is operated (a player object, hereinafter referred to as the "player character PC"). The player can set a weapon (sword) for attacking an enemy character (a target object, hereinafter referred to as the "enemy character EC") and a protective gear (a shield or costume) for defending against attacks by the enemy character EC.

Then, when the equipment is set, it becomes possible to play the battle game. The object of the battle game is for the enemy character EC to be beaten by the player character PC. In the battle game, the player operates the controller 30 to move the player character PC or to perform an attacking motion against the enemy character EC.

The player character PC and the enemy character EC have life points HP individually set therefor. When an attack by the player character PC hits the enemy character EC, damage points are assigned to the enemy character EC, and the damage points are subtracted from the life points HP of the enemy character EC. Meanwhile, when an attack by the enemy character EC hits the player character PC, damage points are assigned to the player character PC, and the damage points are subtracted from the life points HP of the player character PC. The battle game ends in a victory for the player when the life points HP of the enemy character EC become 0 first and ends in a defeat of the player when the life points HP of the player character PC become 0 first.

As shown in FIG. 3A, in the battle game, a virtual game space GS is displayed. The player character PC and the enemy character EC are disposed in the game space GS. In the game device 1, image processing for generating and displaying the game space GS and the characters (the player character PC and the enemy character EC) on the display 10 is executed.

For example, the game device 1 reads various kinds of data and generates a three-dimensional virtual game space GS. Then, an image of the generated game space GS as viewed from a predetermined viewpoint is captured by means of a virtual camera, whereby a two-dimensional image as viewed virtually is generated. This two-dimensional image is displayed on the display 10. In this embodiment, the game space GS includes both the three-dimensional data that is generated in the process of the image processing and the two-dimensional image that is displayed on the display 10. In the game space GS, position information along three axes, namely, an x axis, a y axis, and a z axis, shown in FIG. 3A, is defined, and character actions are controlled on the basis of the position information.

Figure 3B:
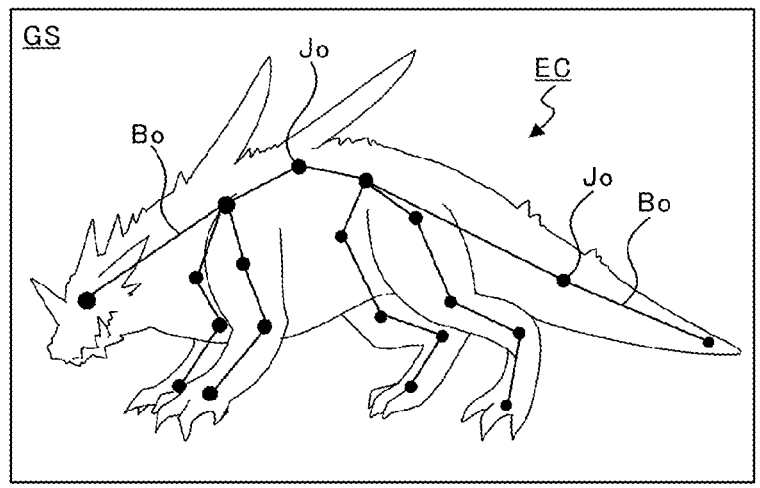
FIG. 3B is an illustration for explaining bone information of an enemy character.

FIG. 3B is an illustration for explaining bone information of the enemy character EC. The enemy character EC has bone information preset therefor, including a plurality of joints Jo (indicated by black-painted circles in FIG. 3B) and bone sections Bo connecting the joints Jo. The tilts of the bone sections Bo relative to the individual three axial directions, i.e., the posture and orientation of the enemy character EC, change according to the relative positions of the joints Jo. The actions of the enemy character EC are controlled on the basis of the bone information.

For example, a plurality of kinds of attacking motions are provided as actions of the enemy character EC. Each of the attacking motions has preset action information therefor, in which the moving trajectories and timings of all the bone sections Bo and joints Jo are defined. The actions of the enemy character EC are controlled on the basis of action information for a determined attacking motion. Note that a certain range around the bone sections Bo is the display range of the enemy character EC and the collision range in which an attack by the player character PC results in a hit. As described above, the bone information is information for controlling the actions and displaying of the enemy character EC. Furthermore, the bone information is used to set a collision range as well as an attack range, in which an attack by the enemy character EC hits the player character PC.

Although a detailed description will be omitted, the player character PC also has bone information set therefor, and the actions and displaying of the player character PC are controlled on the basis of the bone information. That is, when a player operation is input, an action of the player character PC in the game space GS is controlled on the basis of the bone information. Specifically, actions (motions) of the player character PC, including an avoiding motion, which will be described later, have action information preset therefor, in which the moving trajectories and timings of all the bone sections Bo and joints Jo are defined. Furthermore, actions of the player character PC in the game space GS are controlled on the basis of the bone information and the action information.

Figure 3C:
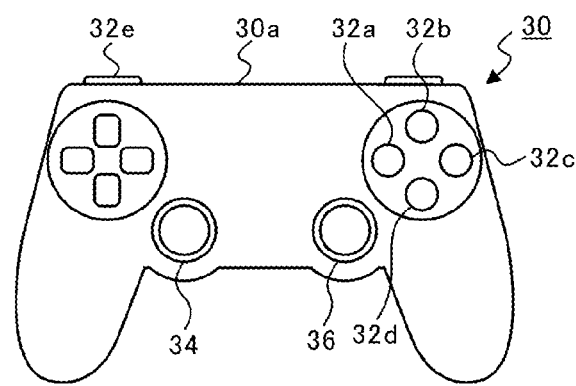
FIG. 3C is an illustration for explaining a controller.

FIG. 3C is an illustration for explaining the controller 30. The controller 30 is communicatively connected to the input/output interface 18 in a wired or wireless manner. The controller 30 includes a main unit 30a. The main unit 30a is configured to have such a shape that can be held by the player with both hands. Furthermore, the main unit 30a is provided with a plurality of operating parts for accepting player operations. Here, some of the operating parts that the controller 30 is provided with will be described.

The main unit 30a is provided with a first button 32a, a second button 32b, a third button 32c, a fourth button 32d, and a fifth button 32e. The first button 32a is an operating part for accepting an attacking operation (specific operation). When an operation of pressing the first button 32a is performed, the player character PC performs an attacking motion of swinging the sword around. The second button 32b is an operating part for drawing and sheathing the sword. When an operation of pressing the second button 32b is performed in a state where the sword is accommodated in the sheath, the player character PC performs a sword-drawing motion to hold the sword. Meanwhile, when an operation of pressing the second button 32b is performed in a state where the sword is held, the player character PC performs a sword-sheathing motion to sheathe the sword.

Furthermore, the third button 32c is an operating part for accepting ascending and descending operations. When an operation of pressing the third button 32c is performed, the player character PC performs an ascending or descending motion to ascend or descend steps. The fourth button 32d is an operating part for accepting an avoiding operation (specific operation). When an operation of pressing the fourth button 32d is performed, the player character PC performs an avoiding motion. In a partial period during this avoiding motion, the player character PC enters an invincible state, in which the player character PC is not susceptible to attacks by the enemy character EC, i.e., is not susceptible to damage.

The fifth button 32e is an operating part for accepting a guarding operation. While an operation of pressing the fifth button 32e is being performed, the player character PC performs a guarding motion for holding the shield to guard against an attack by the enemy character EC. In the case where the player character PC is attacked by the enemy character EC while performing this guarding motion, the damage to the player character PC is decreased.

Furthermore, the main unit 30a is provided with a direction instructing part 34. The direction instructing part 34 is provided so as to project from the main unit 30a and is configured so that the direction instructing part 34 can be tilted in all directions over 360°. The direction instructing part 34 is an operating part for accepting a direction instructing operation from the player. When the operation instructing part 34 is operated, the player character PC takes an action in the tilting direction (hereinafter referred to as the "instructed direction") of the direction instructing part 34.

For example, when only the direction instructing part 34 is operated, the player character PC performs a moving motion to move in the instructed direction in the game space GS. Furthermore, when the direction instructing part 34 and the first button 32a are operated simultaneously, the player character PC performs an attacking motion in the instructed direction. Furthermore, when the direction instructing part 34 and the fourth button 32d are operated simultaneously, the player character PC performs an avoiding motion in the instructed direction. Furthermore, when the direction instructing part 34 and the fifth button 32e are operated simultaneously, the player character PC horizontally moves in the instructed direction without changing the orientation, while guarding with the shield.

Furthermore, the main unit 30a is provided with an angle instructing part 36. The angle instructing part 36 is provided so as to project from the main unit 30a and is configured so that the angle instructing part 36 can be tilted in all directions over 360°. The angle instructing part 36 is an operating part for accepting an operation for changing the angle of the game space GS displayed on the display 10. When the angle instructing part 36 is operated, the angle of the game space GS displayed on the display 10 is changed according to the tilting direction of the angle instructing part 36.

(Motions of Player Character PC and Enemy Character EC)

Next, motions of the player character PC and the enemy character EC will be described. In the battle game, motions of the player character PC are determined according to operations input to the operating parts of the controller 30, as well as programs. Motions of the player character PC include an attacking motion for attacking the enemy character EC, an avoiding motion for avoiding an attack by the enemy character EC, a moving motion in which the player character PC moves, a guarding motion for setting a shield in position to guard against an attack by the enemy character EC, a damaged motion to be performed when attacked by the enemy character EC, an ascending/descending motion in which the player character PC ascends/descends steps, and a falling motion in which the player character PC falls from high ground.

Furthermore, motions of the player character PC include special motions. In this embodiment, the attacking motion, the avoiding motion, the damaged motion, the ascending/descending motion, and the falling motion, described above, are set as specific motions. Special motions are motions that are performed irrespective of operations that are input to the operating parts in the case where the specific motions are not being performed. Note that specific motions are motions that cannot be executed simultaneously (concurrently) with special motions. Meanwhile, the moving motion and the guarding motion are not set as specific motions, and are set as motions that can be executed concurrently with special motions (predetermined motions).

Actions of the enemy character EC include an attacking motion for attacking the player character PC, a damaged motion to be performed when damaged by the player character PC, and a moving motion for moving.

For the motions described above, action information (timelines) are preset. In the action information, the positions of the joints Jo, etc. are defined at every image updating interval of the display 10 (i.e., on a per-frame basis). During a motion, an action of the player character PC or the enemy character EC is controlled on the basis of action information. Therefore, for each motion, a motion time, which is the time taken from the start to the end of an action, is set.

(Attacking Motion of Player Character PC)

Figure 4:
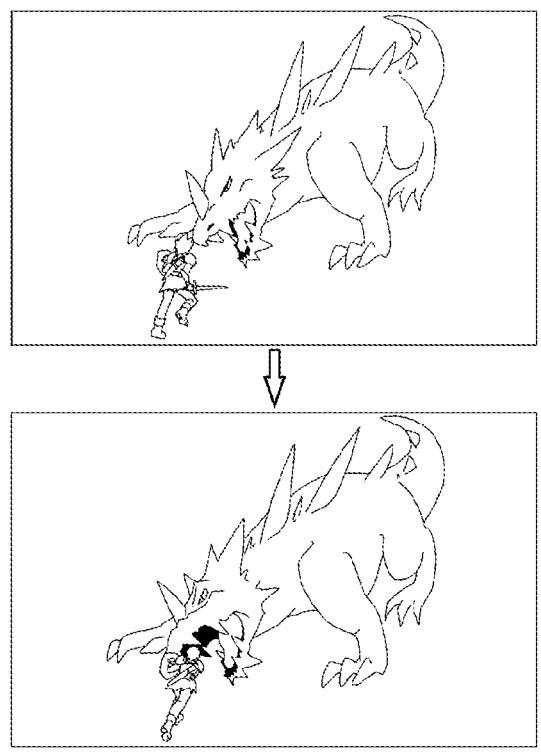
FIG. 4 is an illustration for explaining an attacking motion of a player character.

FIG. 4 is an illustration for explaining an attacking motion of the player character PC. A plurality of kinds of attacking motions of the player character PC are provided. For example, in the case where the first button 32a is operated only once, the player character PC performs an action of swinging the sword forward once, as shown in FIG. 4. Furthermore, in the case where the first button 32a is operated twice consecutively at a predetermined timing, the player character PC performs an action of swinging the sword forward twice (two consecutive attacks). Furthermore, in the case where the first button 32a is operated three times consecutively at a predetermined timing, the player character PC performs an action of swinging the sword forward three times (three consecutive attacks).

Each attacking motion has a collision determination timing (action information) set therefor. The collision determination timing is a timing for determining whether or not an attack by the player character PC has collided with the enemy character EC. At the collision determination timing, collision determination processing, which will be described later, is executed. The collision determination timing is set at a predetermined timing between the start and the end of the attacking motion.

Furthermore, each attacking motion has an attack range (action information) set therefor. In the collision determination processing, it is determined whether or not the enemy character EC is included in the attack range. Here, it is determined that an attack has hit (hit determination) in the case where at least a portion of the enemy character EC is included in the attack range. Note, however, that a hit determination may be made, for example, in the case where a predetermined region of the enemy character EC is included in the attack range in the collision determination processing.

(Damaged Motions of Player Character PC)

Figure 5:
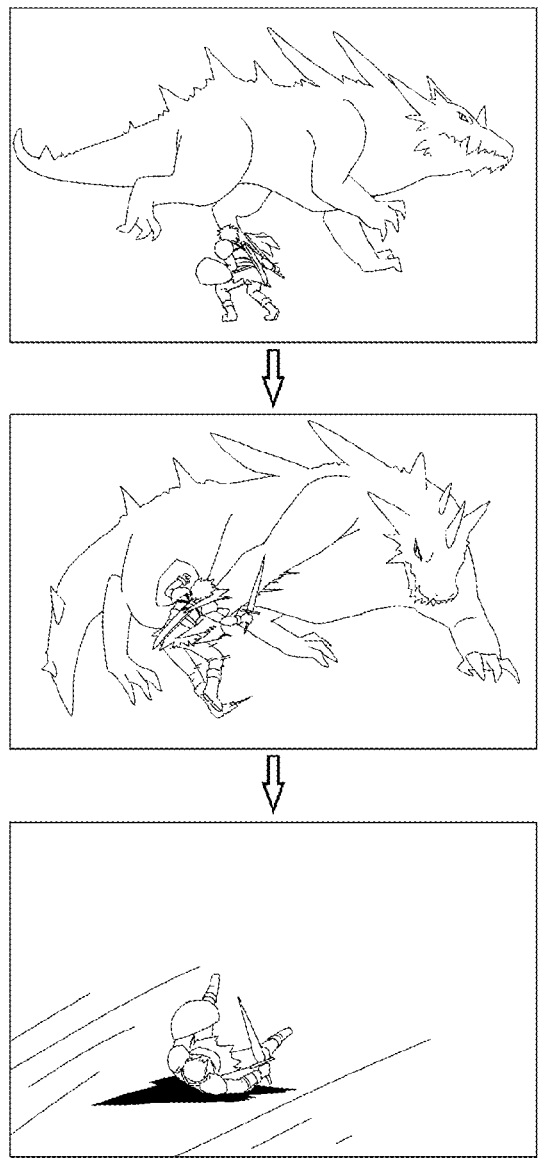
FIG. 5 is an illustration for explaining a damaged motion of the player character.

FIG. 5 is an illustration for explaining a damaged motion of the player character PC. Although a detailed description will be omitted, a plurality of kinds of attacking motions are provided for the enemy character EC, similarly to the player character PC. Furthermore, for each attacking motion of the enemy character EC, similarly to the player character PC, action information is preset, and collision determination processing is executed at collision determination timings.

Then, for example, in the case where the enemy character EC has performed an attacking motion of performing a sweep with the front right foot, as shown in FIG. 5, and it is determined in the collision determination processing that the attack by the enemy character EC has hit the player character PC, a damaged motion of the player character PC is determined in accordance with the current motion of the player character PC.

Specifically, in the case where the player character PC is performing the guarding motion, a damaged motion of using the shield to guard against an attack by the enemy character EC is performed. Meanwhile, in the case where the player character PC is not performing the guarding motion, a damaged motion in which the player character PC is knocked over by an attack by the enemy character EC and falls on the floor is performed, as shown in FIG. 5.

(Avoiding Motion of Player Character PC)

Figure 6:
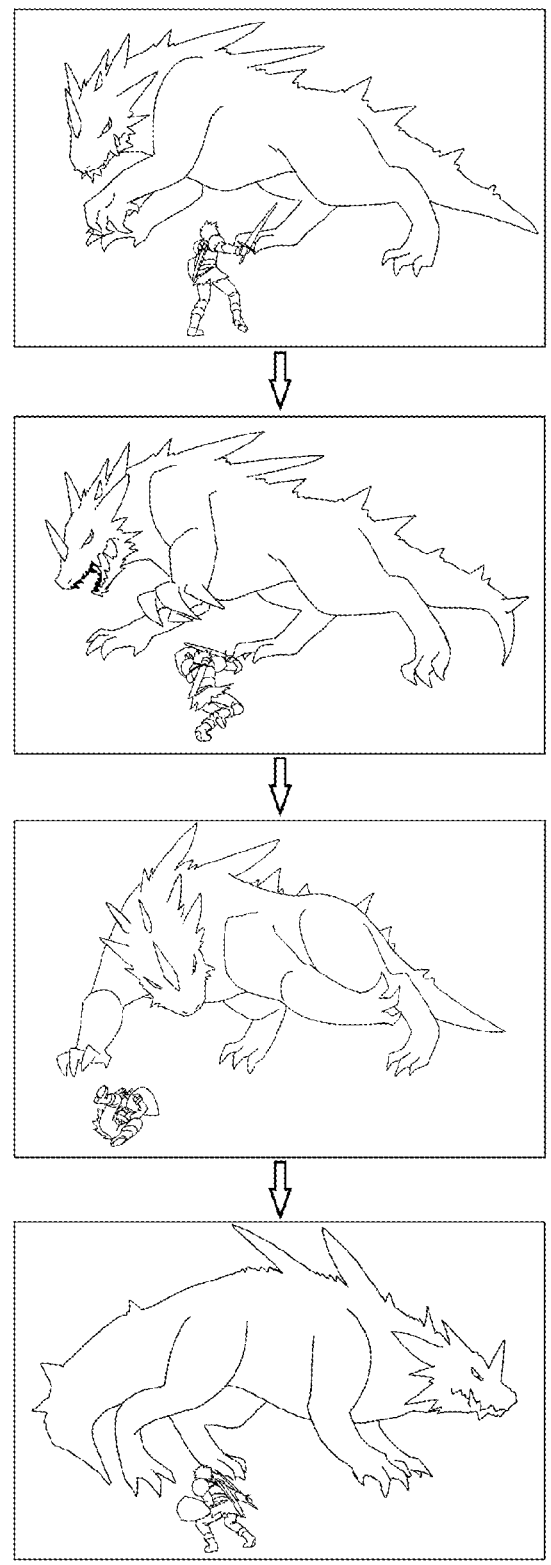
FIG. 6 is an illustration for explaining an avoiding motion of the player character.

FIG. 6 is an illustration for explaining an avoiding motion of the player character PC. When an avoiding operation has been input, the avoiding motion is performed. In the avoiding motion, for example, the player character PC performs rolling leftward (performs one roll on the floor and then stands up), as shown in FIG. 6. Then, the player character PC stands up facing the enemy character EC at a position separated from the enemy character EC by a certain distance.

(Special Motions of Player Character PC)

FIG. 7 is a figure for explaining example special motions of the player character PC. Note that FIG. 7 shows only some special motions. As shown in FIG. 7, as special motions, a plurality of kinds are provided individually for motions that can be performed in a state in which the sword has been drawn (using the sword) and for motions that can be performed in a state of guarding with the shield (guarding).

Furthermore, each of the special motions belongs to one of a plurality of categories. In terms of a program, first, it is determined whether or not the player character PC is performing a specific motion, and it becomes possible to execute a special motion in the case where it is determined that the player character PC is not performing any specific motion.

In the case where it is determined that the player character PC is not performing any specific motion, it is determined whether or not the player character PC is using the sword or is guarding. Then, in the case where it is determined that the player character PC is using the sword or is guarding, one of the categories included in the determined state is determined. For example, one of categories 1 to 11 is determined in the case where it is determined that the player character PC is using the sword, and one of categories 12 to 17 is determined in the case where it is determined that the player character PC is guarding.

Each of the categories has an invocation condition and a priority level set therefor. The invocation condition is set in relation to an immediately preceding motion of the player character PC, the distance between the player character PC and the enemy character EC, the life points HP of the player character PC, the position of the player character PC in the game space GS, parameters relating to the appearance of the player character PC, etc. In this embodiment, the degree of staining of the sword and the degree of staining of the costume are provided as parameters relating to the appearance of the player character PC. The degree of staining of the sword and the degree of staining of the costume will be described later in detail.

For example, the invocation condition set for category 1 is that the distance between the player character PC and the enemy character EC is greater than or equal to a preset intermediate distance and that the life points HP of the player character PC are less than 40%. Furthermore, the invocation condition set for category 9 is that the distance between the player character PC and the enemy character EC is greater than or equal to the intermediate distance and that the degree of staining of the costume is greater than or equal to a threshold ("50" here) (predetermined condition). Furthermore, the invocation condition set for category 11 and category 17 is that the distance between the player character PC and the enemy character EC is greater than or equal to the intermediate distance and that the degree of staining of the sword is greater than or equal to a threshold ("50" here) (predetermined condition).

Three kinds of priority levels, namely, "high", "intermediate", and "low", are provided. Each of the categories has one of "high", "intermediate", and "low" set therefor as the priority level.

Furthermore, for example, in the case where it is determined that the player character PC is using the sword, first, it is determined whether the invocation conditions of category 10 and category 11, which have the highest priority level (priority level "high"), are satisfied. In the case where it is determined as a result that the invocation conditions of both category 10 and category 11 are satisfied, one of these categories is determined at random (with equal probabilities). Furthermore, in the case where it is determined that the invocation condition of one of category 10 and category 11 is satisfied, the category satisfying the invocation condition is determined.

Meanwhile, in the case where it is determined that the invocation condition of neither category 10 nor category 11, which have the highest priority level, is satisfied, it is determined whether or not the invocation conditions of categories 4 to 9, which have the next highest priority level (priority level "intermediate"), are satisfied. In the case where it is determined as a result that the invocation conditions of a plurality of categories among categories 4 to 9, which belong to the priority level "intermediate", are satisfied, one of the categories is determined at random (with equal probabilities) from among the categories satisfying the invocation conditions. Furthermore, in the case where it is determined that only one of the invocation conditions of categories 4 to 9, which belong to the priority level "intermediate", is satisfied, the category satisfying the invocation condition is determined.

Meanwhile, in the case where it is determined that the invocation condition of none of categories 4 to 9, which belong to the priority level "intermediate", is satisfied, it is determined whether or not the invocation conditions of categories 1 to 3, which have the lowest priority level (priority level "low"), are satisfied. In the case where it is determined as a result that the invocation conditions of a plurality of categories among categories 1 to 3, which belong to the priority level "low", are satisfied, one of the categories is determined at random (with equal probabilities) from among the categories satisfying the invocation conditions. Furthermore, in the case where it is determined that the invocation condition of only one category among categories 1 to 3, which belong to the priority level "low", is satisfied, the category satisfying the invocation condition is determined.

As described above, it is determined whether or not the invocation conditions of the categories belonging to the individual priority levels are satisfied in descending order of the priority levels, and in the case where there are categories satisfying the invocation conditions, one of the categories satisfying the invocation conditions is determined.

Then, after one category satisfying the invocation condition is determined, one of the special motions belonging to that category is determined. For example, in the case where only one special motion belongs to the determined category, that special motion is determined. Furthermore, in the case where a plurality of special motions belong to the determined category, one of the special motions is determined at random (with equal probabilities).

Furthermore, in the case where a special motion has been determined, a waiting time before the player character PC is caused to perform the special motion is determined at random from a predetermined range (e.g., one to five seconds). Then, the player character PC is caused to perform the determined special motion after the elapse of the waiting time.

Furthermore, in the case where the player character PC performs a special motion, a cool-down time is set at random from a predetermined range (e.g., five to ten seconds) for the category to which the special motion belongs. The cool-down time is provided in order to prevent special motions belonging to the same category from being performed consecutively within a short period. Therefore, after a special motion is finished, a special motion belonging to a category for which a cool-down time is set is not performed before the cool-down time elapses.

Note that while the player character PC is performing a special motion, input operations to the operating parts of the controller 30 are accepted. That is, special motions do not have an operation-disabled period set therefor. Therefore, for example, an attacking operation, an avoiding operation, a guarding operation, or an ascending/descending operation is performed while a special motion is being performed, the special motion is canceled, and a motion corresponding to the attacking operation, the avoiding operation, the guarding operation, or the ascending/descending operation is performed. Furthermore, when an attack by the enemy character EC hits the player character PC while the player character PC is performing a special motion, the special motion is canceled, and a damaged motion is performed.

Meanwhile, when a moving operation is performed while a special motion is being performed, the special motion is not canceled, and the special motion is performed together with the moving motion. At this time, the upper body of the player character PC is caused to perform the special motion, and the lower body of the player character PC is caused to perform the moving motion. This reduces the unnaturalness that arises when the moving motion and the special motion are performed simultaneously, which serves to improve the sense of reality.

Figure 8:
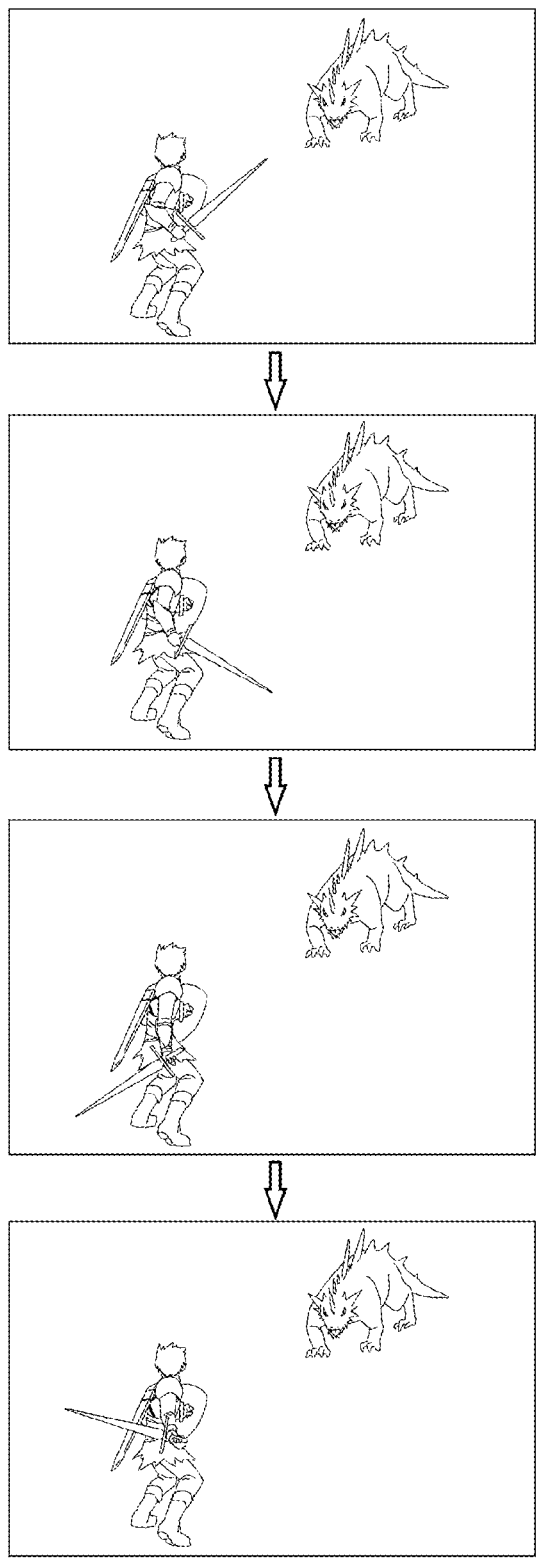
FIG. 8 is an illustration for explaining a special motion "swing the sword around".

FIG. 8 is an illustration for explaining a special motion "swing the sword around". For example, in the case where "swing the sword around" has been determined as a special motion, a special motion in which the player character PC swings the sword over a half turn is performed, as shown in FIG. 8.

Figure 9:
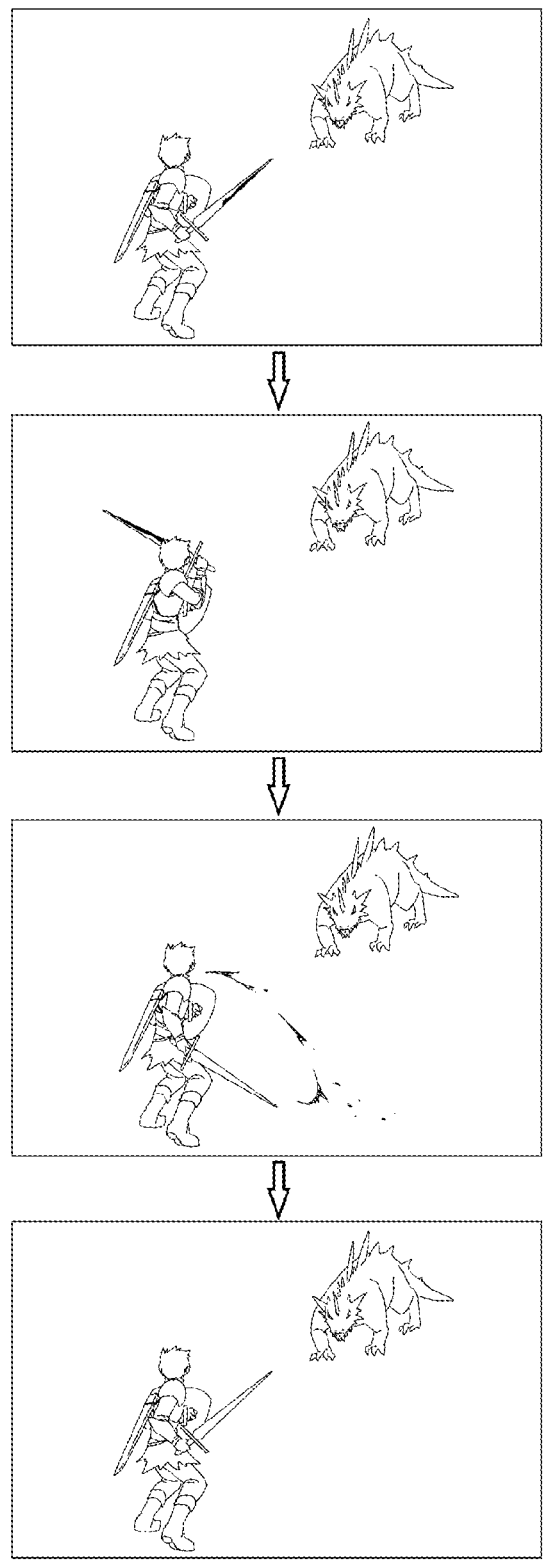
FIG. 9 is an illustration for explaining a special motion "shake off blood on the sword".

FIG. 9 is an illustration for explaining a special motion "shake off blood on the sword". For example, in the case where "shake off blood on the sword" has been determined as a special motion, a special motion in which the player character PC quickly moves the sword to shake off blood adhering to the sword is performed, as shown in FIG. 9. As a result of performing the special motion "shake off blood on the sword", a portion or the entirety of the blood adhering to the sword is removed from the sword.

Figure 10:
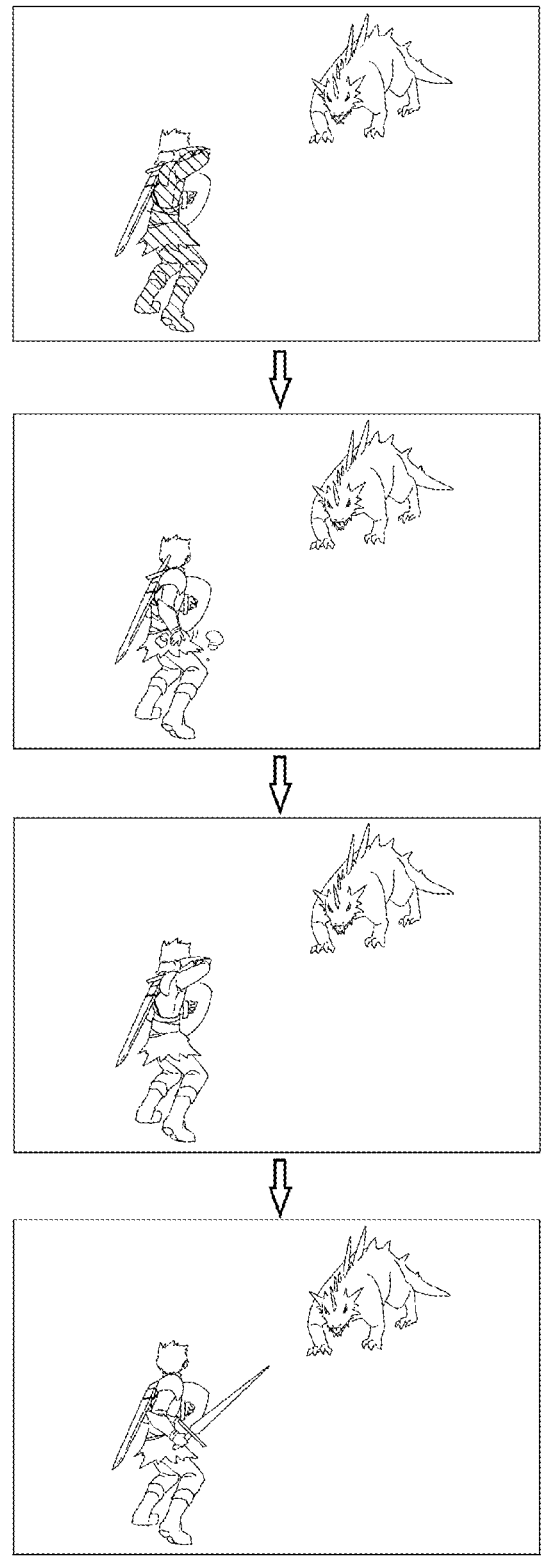
FIG. 10 is an illustration for explaining a special motion "remove dust".

FIG. 10 is an illustration for explaining a special motion "remove dust". In FIG. 10, stains (dust) on the costume are indicated by hatching. For example, in the case where "remove dust" has been determined as a special motion, a special motion in which the player character PC removes dust adhering to the costume is performed, as shown in FIG. 10. As a result of performing the special motion "remove dust", a portion or the entirety of the dust adhering to the costume is removed from the costume.

Meanwhile, the degrees of staining are set for the sword and the costume that the player character PC is equipped with. Furthermore, the display modes of the sword and the costume are changed in accordance with the degrees of staining when the player character PC is displayed. In other words, the appearance of the player character PC is displayed while being changed in accordance with the degrees of staining. In the game device 1, a shader, which is a program for performing shading, changes the display modes of the appearance of the player character PC with reference to the degrees of staining. Note that, for example, when displaying the sword, the game device 1 may superimpose blood texture in accordance with the degree of staining or may switch to texture with adhering blood in accordance with the degree of staining.

FIG. 11A is a figure for explaining the relationship between the degree of staining and the display mode of the sword. FIG. 11B is a figure for explaining change values of the degree of staining of the sword. The degree of staining of the sword is changed in the range of 0 to 99. Furthermore, as shown in FIG. 11A, the display mode of the sword is divided into four levels, namely, "no stain", "small stain", "intermediate stain", and "large stain". "No stain" refers to a state in which no blood is adhering to the sword. "Small stain" refers to a state in which the amount of blood adhering to the sword is less compared with "intermediate stain" and "large stain". Furthermore, "intermediate stain" refers to a state in which the amount of blood adhering to the sword is less compared with "large stain". "Large stain" refers to a state in which the amount of blood adhering to the sword is the greatest.

In the case where the degree of staining of the sword is less than a first threshold (e.g., "20"), "no stain" is determined as the display mode of the sword, and the sword is displayed in the state in which no blood is adhering thereto. Furthermore, in the case where the degree of staining of the sword is greater than or equal to the first threshold and is less than a second threshold (e.g., "40"), "small stain" is determined as the display mode of the sword, and the sword is displayed in a state in which a small amount of blood is adhering thereto. Furthermore, in the case where the degree of staining of the sword is greater than or equal to the second threshold and is less than a third threshold (e.g., "60"), "intermediate stain" is determined as the display mode of the sword, and the sword is displayed in a state in which a greater amount of blood is adhering to the sword compared with "small stain". Furthermore, in the case where the degree of staining of the sword is greater than or equal to the third threshold, "large stain" is determined as the display mode of the sword, and the sword is displayed in a state in which a greater amount of blood is adhering to the sword compared with "intermediate stain".

As shown in FIG. 11B, the degree of staining of the sword is changed (updated) in the case where an attack has hit the enemy character EC and in the case where "shake off blood on the sword" has been performed as a special motion. In the case where the player character PC has performed an attacking motion and the attack has hit the enemy character EC, the degree of staining of the sword is updated for each count of the cumulative number of attacks. Specifically, in the case where an attack by the player character PC has hit once, "5" is added to the degree of staining of the sword. Note that even in the case where the player character PC has performed two or three consecutive attacks, in the case where only one attack has hit the enemy character EC, "5" is added to the degree of staining of the sword.

Furthermore, in the case where two consecutive attacks by the player character PC have hit, "12" is added to the degree of staining of the sword. Note that in the case where the player character PC has performed three consecutive attacks and only two attacks have hit the enemy character EC, "12" is added to the degree of staining of the sword. Furthermore, in the case where three consecutive attacks by the player character PC have hit, i.e., in the case where the player character PC has performed three consecutive attacks and all the attacks have hit the enemy character EC, "20" is added to the degree of staining of the sword.

As described above, values are added to the degree of staining of the sword in accordance with the cumulative number of times that an attack by the player character PC has hit the enemy character EC. Note that in the case where the degree of staining of the sword is "99", no value is added to the degree of staining of the sword even when an attack by the player character PC has hit the enemy character EC.

Meanwhile, in the case where "shake off blood on the sword" has been performed as a special motion, "−50" is added to the degree of staining of the sword. That is, in the case where "shake off blood on the sword" has been performed as a special motion, "50" is subtracted from the degree of staining of the sword.

Note, however, that in the case where "shake off blood on the sword" has been performed as a special motion, instead of immediately subtracting a value from the degree of staining of the sword, a value is subtracted from the degree of staining of the sword after the elapse of a predetermined time since "shake off blood on the sword" was performed as a special motion. The predetermined time is set to be a timing at which the player character PC shakes off blood adhering to the sword. Therefore, when "shake off blood on the sword" has been performed as a special motion and the player character PC has shaken off blood adhering to the sword, a value is subtracted from the degree of staining of the sword, whereby the sword is displayed in a state in which the amount of blood adhering to the sword has been reduced or the blood has been eliminated.

Note that in the case where the special motion "shake off blood on the sword" is canceled before the predetermined time elapses after the start of the special motion, due to an operation input by the player, damage given by the enemy character EC, etc., no value is subtracted from the degree of staining of the sword.

FIG. 12A is a figure for explaining the relationship between the degree of staining and the display mode of the costume. FIG. 12B is a figure for explaining change values of the degree of staining of the costume. The degree of staining of the costume is changed in the range of 0 to 99. Furthermore, as shown in FIG. 12A, the display mode of the costume is set in a non-stepwise manner in accordance with the degree of staining. For example, in the case where the degree of staining is "0", no dust is adhering to the costume. Furthermore, the amount of dust adhering to the costume gradually increases as the degree of staining increases, and the greatest amount of dust is adhering to the costume in the case where the degree of staining is "99".

As shown in FIG. 12B, the degree of staining of the costume is changed (updated) in the case where the player character PC has come into contact with the floor and in the case where "remove dust" has been performed as a special motion. At a timing when an attack by the enemy character EC has hit the player character PC and the player character PC has come into contact with the floor, "20" is added to the degree of staining of the costume. Furthermore, at a timing when the player character PC has performed an avoiding motion and has come into contact with the floor, "10" is added to the degree of staining of the costume. Note that in the case where the degree of staining of the costume is "99", no value is added to the degree of staining of the costume even when the player character PC has come into contact with the floor.

Meanwhile, in the case where "remove dust" has been performed as a special motion, a maximum of "−30" is added to the degree of staining of the costume. That is, in the case where "remove dust" has been performed as a special motion, a maximum of "30" is subtracted from the degree of staining of the costume.

Here, in the case where "remove dust" has been performed as a special motion, instead of immediately subtracting a value from the degree of staining of the costume, "10" is subtracted from the degree of staining of the costume at a timing when a first time has elapsed since "remove dust" was performed as a special motion. Furthermore, "10" is further subtracted from the degree of staining of the costume at a timing when a second time, which is longer than the first time, has elapsed. Furthermore, "10" is further subtracted from the degree of staining of the costume at a timing when a third time, which is longer than the second time, has elapsed.

The first time, the second time, and the third time are set to be shorter than a time taken to execute "remove dust" as a special motion. Furthermore, the first time, the second time, and the third time are set at timings at which the player character PC shakes off dust adhering to the costume. Therefore, each time "remove dust" is performed as a special motion and the player character PC shakes off dust adhering to the costume, a value is subtracted from the degree of staining of the costume, whereby the costume is displayed in the state where the amount of dust adhering to the costume has been reduced or the dust has been eliminated, which serves to improve the sense of reality.

Note that in the case where the special motion "remove dust" is canceled before the first time elapses after the start of the special motion, due to an operation input by the player, damage given by the enemy character EC, etc., no value is subtracted from the degree of staining of the costume. Furthermore, in the case where the special motion is canceled before the second time elapses after the elapse of the first time, due to an operation input by the player, damage given by the enemy character EC, etc., only "10" is subtracted from the degree of staining of the costume. Furthermore, in the case where the special motion is canceled before the third time elapses after the elapse of the second time, due to an operation input by the player, damage given by the enemy character EC, etc., only "20" is subtracted from the degree of staining of the costume.

As described above, in this embodiment, in the case where the player character PC is not performing any specific motion and the appearance of the player character PC satisfies a predetermined condition, the player character PC is caused to perform a special motion irrespective of an operation that is input. Furthermore, in the case where the player character PC is caused to perform a special motion, it is possible to change the appearance of the player character PC. For example, in the case where the player character PC is not performing any specific motion and the degree of staining of the sword of the player character PC is greater than or equal to the threshold, it is possible to cause the player character PC to perform the special motion "shake off blood on the sword" irrespective of an operation that is input. Furthermore, in the case where the player character PC is caused to perform the special motion "shake off blood on the sword", the appearance of the sword, i.e., the display mode of the sword, is changed. Thus, special motions cause changes in the appearance of the player character PC instead of just making up for the time, which makes it possible to improve the sense of reality and the sense of presence.

(Description of Control Unit of Game Device 1)

A control unit of the game device 1 for determining a special motion will be described below.

Figure 13:
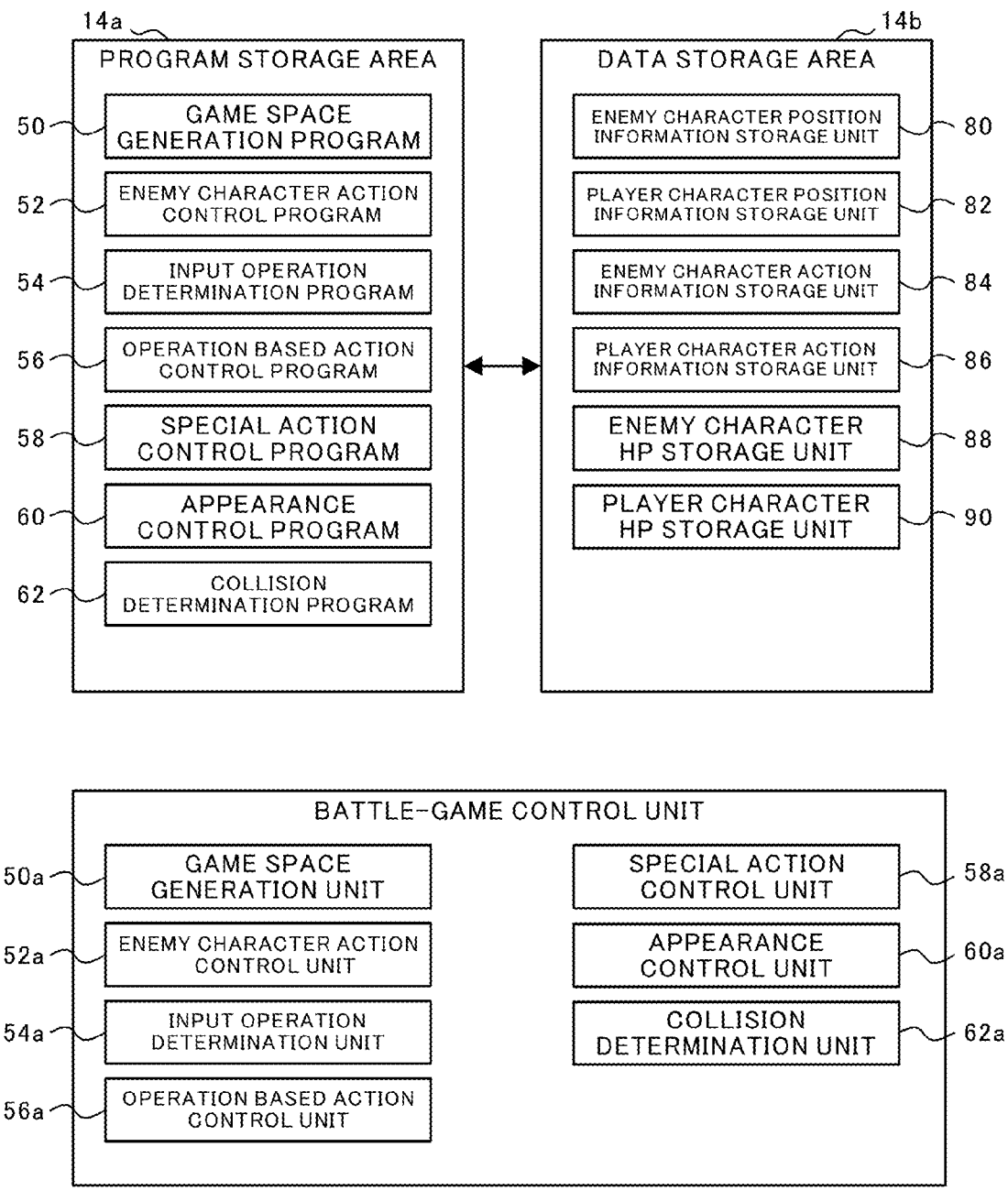
FIG. 13 is a diagram for explaining the configuration of a memory 14 and the functions of a computer in the game device 1.

FIG. 13 is a diagram for explaining the configuration of the memory 14 and the function of a computer in the game device 1. In the memory 14, a program storage area 14*a* and a data storage area 14*b* are provided. When the battle game is started, the CPU 12 stores programs (modules) for a battle-game control process in the program storage area 14*a*.

The programs for the battle-game control process include a game-space generation program 50, an enemy-character-action control program 52, an input-operation determination program 54, an operation-based-action control program 56, a special-action control program 58, an appearance control program 60, and a collision determination program 62. Note that the programs listed in FIG. 13 are examples, and a large number of other programs for the battle-game control process are provided.

In the data storage area 14*b*, an enemy-character-position-information storage unit 80, a player-character-position-information storage unit 82, an enemy-character-action-information storage unit 84, a player-character-action-information storage unit 86, an enemy-character-HP storage unit 88, and a player-character-HP storage unit 90 are provided as storage units for storing data. Note that the storage units listed above are examples, and a large number of other storage units are provided in the data storage area 14*b*.

The CPU 12 runs the individual programs stored in the program storage area 14*a* and updates the data in the individual storage units in the data storage area 14*b*. Furthermore, the CPU 12 runs the programs stored in the program storage area 14*a* to cause the game device 1 (computer) to function as a battle-game control unit.

Specifically, the CPU 12 runs the game-space generation program 50 to cause the computer to function as a game-space generation unit 50*a*. Similarly, the CPU 12 runs the enemy-character-action control program 52, the input-operation determination program 54, the operation-based-action control program 56, the special-action control program 58, the appearance control program 60, and the collision determination program 62 to cause the computer to function as an enemy-character-action control unit 52*a*, an input-operation determination unit 54*a*, an operation-based-action control unit 56*a*, a special-action control unit 58*a*, an appearance control unit 60*a*, and a collision determination unit 62*a*, respectively.

The game-space generation unit 50*a* generates and displays the game space GS on the display 10.

The enemy-character-action control unit 52*a* determines an action to be executed by the enemy character EC from among preset actions (motions), such as a moving motion, an attacking motion, and a damaged motion. Furthermore, the enemy-character-action control unit 52*a* stores enemy-character-action information indicating action information for the determined motion in the enemy-character-action-information storage unit 84.

The input-operation determination unit 54*a* determines whether or not an operation has been input from the controller 30 and the content of the operation input from the controller 30. That is, the input-operation determination unit 54*a* identifies the kind of operation among operations including an attacking operation, an avoiding operation, a guarding operation, and an ascending/descending operation, as well as an instructed direction.

The operation-based-action control unit 56*a* determines a motion to be performed by the player character PC on the basis of the content of the operation input from the controller 30. For example, the operation-based-action control unit 56*a* determines an attacking motion when an attacking operation has been input. Furthermore, the operation-based-action control unit 56*a* stores player-character action information indicating action information for the determined motion in the player-character-action-information storage unit 86.

The special-action control unit 58*a* determines whether or not a specific motion is being performed. Then, in the case where it is determined that the specific motion is not being performed, the special-action control unit 58*a* determines a specific motion to be performed by the player character PC. Furthermore, the special-action control unit 58*a* stores player-character action information indicating action information for the determined special motion in the player-character-action-information storage unit 86.

The appearance control unit 60*a* updates the appearance of the player character PC, i.e., the degrees of staining of the sword and the costume, in accordance with motions of the player character PC. Furthermore, the appearance control unit 60*a* displays the sword and the costume on the basis of the degrees of staining of the sword and the costume.

The collision determination unit 62*a* determines whether or not an attack has hit the opponent when a timing for collision determination arrives during attacking motions by the enemy character EC and the player character PC. Furthermore, the collision determination unit 62*a* determines damage points in the case where it is determined that the attack has hit. Furthermore, the collision determination unit 62*a* subtracts the determined damage points from the life points HP of the opponent.

(Description of Battle-Game Control Process)

Next, the battle-game control process of the game device 1 will be described. In the following, processing relating to special motions of the player character PC will be described, while omitting a description of processing not relating to special motions of the player character PC.

Figure 14:
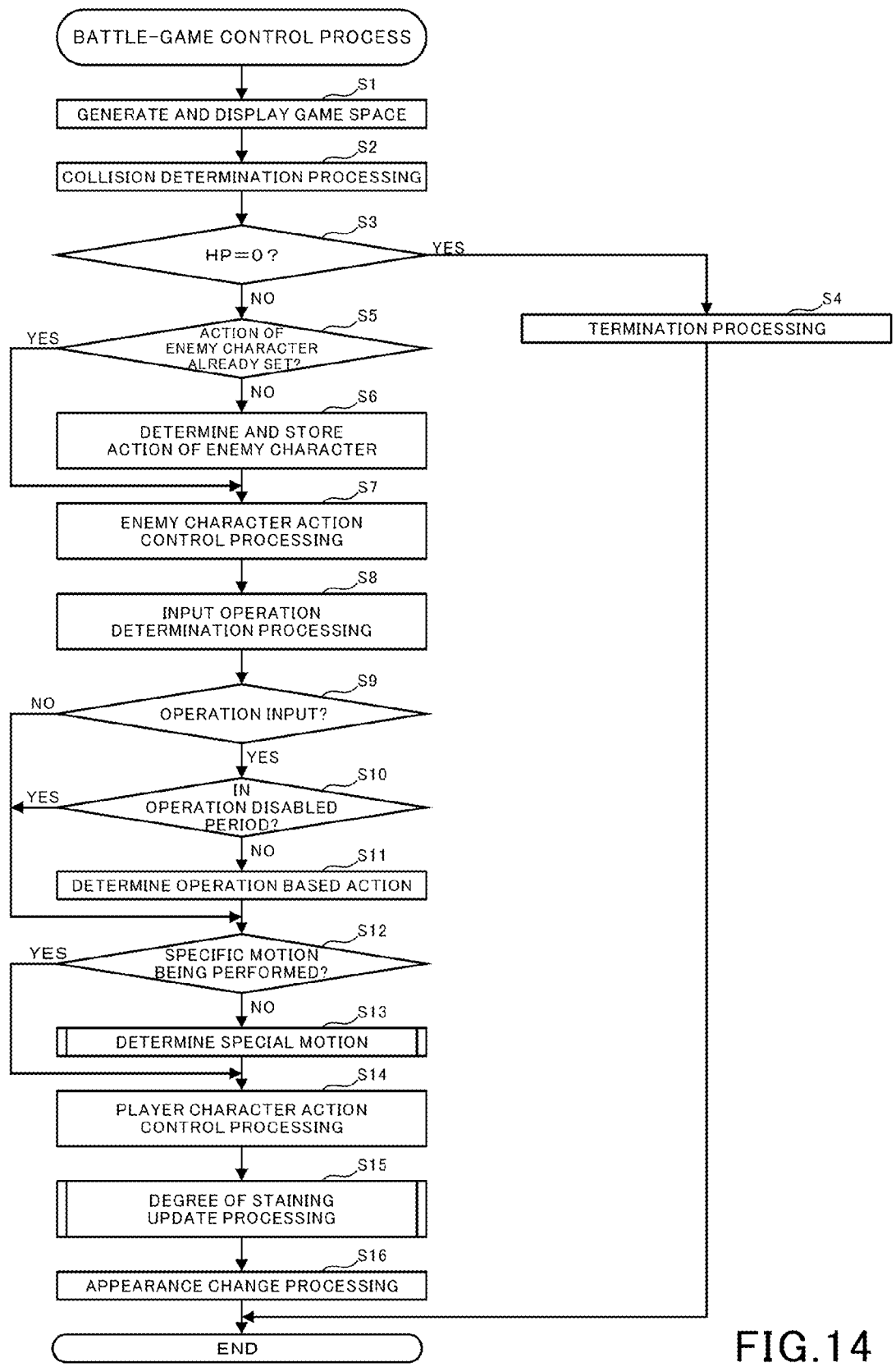
FIG. 14 is a flowchart for explaining a battle-game control process.

FIG. 14 is a flowchart showing an example of the battle-game control process. The battle-game control process in the game device 1 is executed every image updating interval of the display 10. For example, the image updating interval, i.e., the frame rate, is 60 F/seconds, and thus the following battle-game control process is executed sixty times per second. Note that this frame rate is merely an example, and the frame rate may be designed as appropriate.

In the battle-game control process, the game-space generation unit 50*a* generates and displays the game space GS on the display 10 (S1). The collision determination unit 62*a* executes collision determination processing (S2) for determining whether or not an attack by the enemy character EC or the player character PC has hit the opponent. Specifically, on the basis of the player-character action information stored in the player-character-action-information storage unit 86, the collision determination unit 62*a* determines that an attack by the player character PC has hit the enemy character EC in the case where a timing for collision determination during an attacking motion by the player character PC has arrived and at least a portion of the enemy character EC is located within the attack range. Then, the collision determination unit 62*a* determines damage points for the enemy character EC, and subtracts the determined damage points from the life points HP of the enemy character EC, stored in the enemy-character-HP storage unit 88. Here, the damage points are determined on the basis of various kinds of information, such as the kind of the attacking motion, the position of the enemy character EC, and equipment. Furthermore, the enemy-character-action control unit 52a determines a damaged motion to be performed when the enemy character EC is damaged, and stores the determined damaged motion in the enemy-character-action-information storage unit 84.

Similarly, on the basis of the enemy-character action information stored in the enemy-character-action-information storage unit 84, the collision determination unit 62a determines that an attack by the enemy character EC has hit the player character PC in the case where a timing for collision determination during an attacking motion by the enemy character EC has arrived and at least a portion of the player character PC is located within the attack range, unless the player character PC is in an invincible period. Then, the collision determination unit 62a determines damage points for the player character PC, and subtracts the determined damage points from the life points HP of the player character PC, stored in the player-character-HP storage unit 90. Here, the damage points are determined on the basis of various kinds of information, such as the kind of the attacking motion, the position of the player character PC, and equipment. Furthermore, the battle control unit determines a damaged motion to be performed when the enemy character EC is damaged, and stores the determined damaged motion in the player-character-action-information storage unit 86.

Then, when the life points HP of the player character PC or the enemy character EC have become zero (YES in S3), the battle-game control unit executes termination processing that is needed when terminating the battle game (S4). Meanwhile, when the life points HP of neither the player character PC nor the enemy character EC have become zero (NO in S3), the enemy-character-action control unit 52a determines whether or not a motion of the enemy character EC is set (S5). In the case where a motion of the enemy character EC has not been set (NO in S5), the enemy-character-action control unit 52a determines a motion to be performed by the enemy character EC and stores the determined motion in the enemy-character-action-information storage unit 84 (S6).

The enemy-character-action control unit 52a controls the displaying of the enemy character EC in the game space GS according to the timelines of various kinds of motions that are set (S7).

Furthermore, the input-operation determination unit 54a executes input-operation determination processing for analyzing a signal input from the controller 30 (S8). In the case where an operation has been input from the controller 30 (YES in S9), the operation-based-action control unit 56a determines whether input operations are currently disabled (S10). Note that operation-disabled periods are preset for individual actions, such as the attacking motion and the damaged motion of the player character PC.

In the case where operations are not currently disabled (NO in S10), the input-operation determination unit 54a determines a motion to be performed by the player character PC in accordance with the input operation, and stores the determined motion in the player-character-action-information storage unit 86 (S11). Here, for example, if an attacking operation has been input, the operation-based-action control unit 56a determines the attacking motion of the player character PC.

The special-action control unit 58a determines whether or not the player character PC is performing a specific motion (S12). In the case where the player character PC is not performing the specific motion (NO in S12), the special-action control unit 58a executes a special-motion determination process for determining a special motion to be performed by the player character PC (S13). Furthermore, the special-action control unit 58a stores action information indicating the determined special motion in the player-character-action-information storage unit 86. The special-motion determination process will be described later in detail.

Furthermore, the operation-based-action control unit 56a or the special-action control unit 58a controls the displaying of the player character PC in the game space GS according to the timelines of various kinds of motions that are set (S14).

The appearance control unit 60a executes a degree-of-staining update process for updating the degrees of staining of the sword and the costume according to the motion being executed by the player character PC and the timeline of that motion (S15). Then, the appearance control unit 60a controls the displaying of the sword and the costume in accordance with the updated degrees of staining of the sword and the costume, as shown in FIGS. 11A and 12A (S16). The degree-of-staining update process will be described later in detail.

Figure 15:
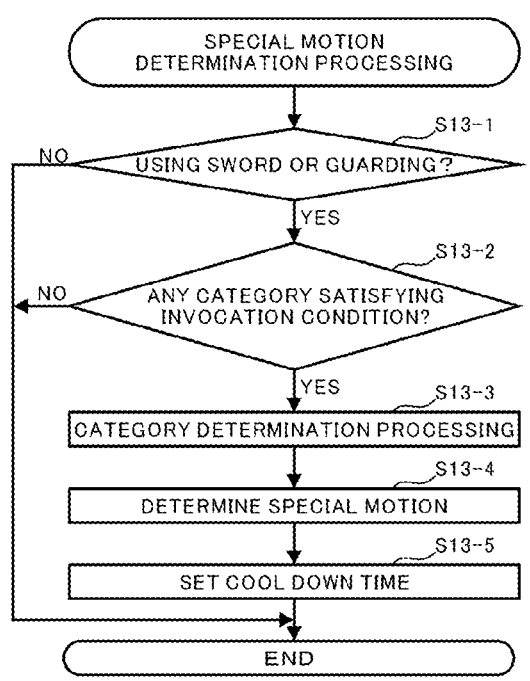
FIG. 15 is a flowchart for explaining a special-motion determining process.

FIG. 15 is a flowchart for explaining the special-motion determination process. As shown in FIG. 15, the special-action control unit 58a determines whether or not the player character PC is using the sword or guarding (S13-1). In the case where it is determined that the player character PC is using the sword or guarding (YES in S13-1), the special-action control unit 58a, for categories corresponding to the status of the player character PC (using the sword or guarding), determines whether or not each of the categories corresponding to individual priority levels satisfies an invocation condition in descending order of the priority levels (S13-2). Note that for categories for which a cool-down time is set, it is not determined whether or not an invocation condition is satisfied.

Then, in the case where there are categories satisfying invocation conditions (YES in S13-2), the special-action control unit 58a determines one category from among the categories satisfying the invocation conditions (S13-3). Then, the special-action control unit 58a determines one special motion at random from among special motions belonging to the determined category (S13-4). Furthermore, the special-action control unit 58a sets a cool-down time for the determined category (S13-5).

Figure 16:
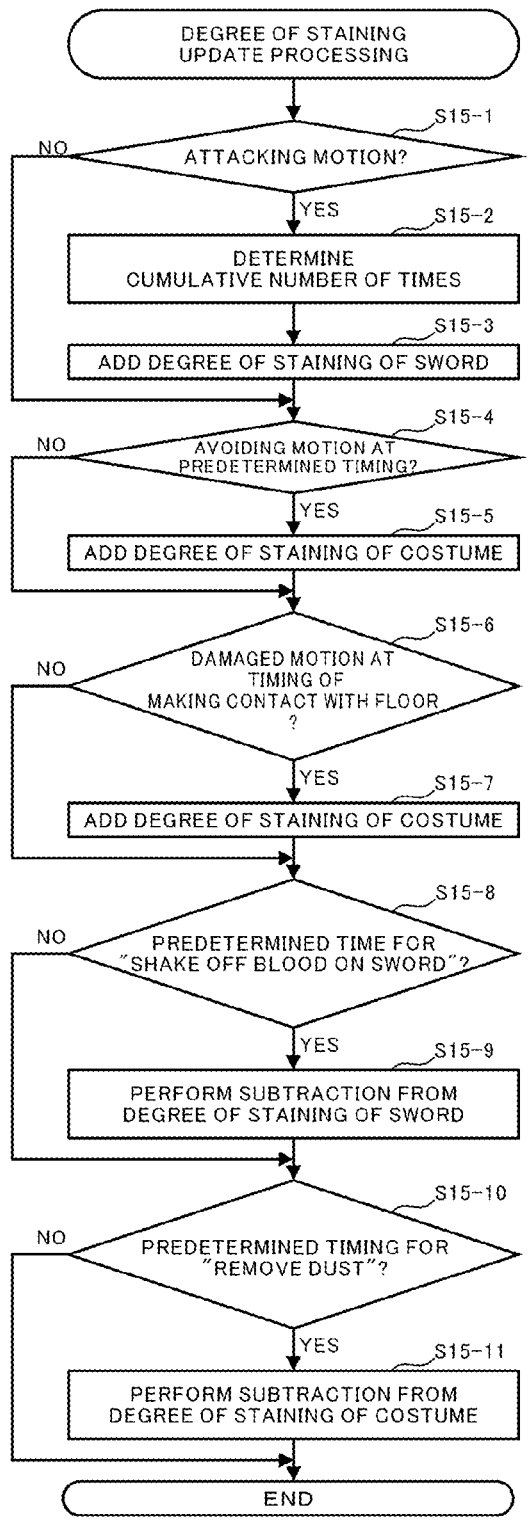
FIG. 16 is a flowchart for explaining a staining-degree updating process.

FIG. 16 is a flowchart for explaining the degree-of-staining update process. As shown in FIG. 16, the appearance control unit 60a determines whether an attacking motion has been performed (S15-1), and determines the cumulative number of times that an attack by the player character PC has hit the enemy character EC (S15-2) in the case where an attacking motion has been performed (YES in S15-1). Then, the appearance control unit 60a adds a change value corresponding to the determined cumulative number of times to the degree of staining of the sword (S15-3).

Furthermore, the appearance control unit 60a determines whether a timing at which the player character PC comes into contact with a floor during an avoiding motion has arrived (S15-4). Then, in the case where a timing at which the player character PC comes into contact with the floor has arrived (YES in S15-4), the appearance control unit 60a adds a change value for the avoiding motion to the degree of staining of the costume (S15-5).

Furthermore, the appearance control unit 60*a* determines whether or not a timing at which the player character PC comes into contact with the floor during a damaged motion has arrived (S15-6). Then, in the case where a timing at which the player character PC comes into contact with the floor has arrived (YES in S15-6), the appearance control unit 60*a* adds a change value for the damaged motion to the degree of staining of the costume (S15-7).

Furthermore, the appearance control unit 60*a* determines whether or not a timing (predetermined time) at which the player character PC shakes off blood adhering to the sword during a special motion "shake off blood on the sword" has arrived (S15-8). Then, when the predetermined time has arrived (YES in S15-8), the appearance control unit 60*a* adds a change value for the special motion "shake off blood on the sword" to the degree of staining of the sword (S15-9). Here, since the change value is a negative value, a subtraction from the degree of staining of the sword is performed.

Furthermore, the appearance control unit 60*a* determines whether or not a first time, a second time, or a third time (a predetermined timing) has arrived during a special motion "remove dust" (S15-10). Then, in the case where the first time, the second time, or the third time has arrived (YES in S15-10), the appearance control unit 60*a* adds a change value for the special motion "remove dust" to the degree of staining of the costume (S15-11). Here, since the change value is a negative value, a subtraction from the degree of staining of the costume is performed.

Although an aspect of the embodiment has been described with reference to the accompanying drawings, it is needless to say that the present invention is not limited to the embodiment described above. It is obvious that a person skilled in the art could conceive of various variations and modifications within the scope recited in claims, and it will be understood that those variations and modifications naturally fall within the technical scope of the present invention.

For example, the display modes of the player character PC and the enemy character EC in the embodiment described above are merely examples. In any case, it suffices for the player object disposed in the virtual game space GS to perform one of actions at least including a specific motion and a special motion.

Furthermore, in the embodiment described above, an attacking motion, an avoiding motion, a damaged motion, an ascending/descending motion, and a falling motion are set as specific motions. However, it suffices for a specific motion to be a motion to be performed by the player object in accordance with a specific operation when the specific operation has been performed on an operating part of the controller 30. For example, the attacking motion and the avoiding motion need not be set as specific motions.

Furthermore, in the embodiment described above, the degrees of staining of the sword and the costume are updated on the basis of motions of the player character PC. However, the degrees of staining may be updated on the basis of various conditions, such as the elapse of time and scene transitions.

Furthermore, the control processes in the embodiment described above are merely examples. In the embodiment described above, the control process for executing the battle game is executed at the game device 1. However, the control process for executing the battle game may be executed, for example, concurrently at the game device 1 and the server 2. That is, the information processing system S, which is a client-server system, may execute the control processes described above.

Furthermore, in the embodiment described above, the program for realizing the battle game may be stored in a computer-readable storage medium. Furthermore, the embodiment described above may be an information processing method for realizing the functions and the steps shown in the flowcharts.

INDUSTRIAL APPLICABILITY

The present invention is applicable to information processing programs, information processing methods, and game devices.

What is claimed is:

1. A non-transitory computer readable medium storing a program causing a computer to execute:
    displaying a player object on a virtual game space;
    causing the player object to perform a first motion when a first operation has been input;
    causing the player object to perform a special motion when the player object is not performing the first motion and an appearance of the player object satisfies a predetermined condition, irrespective of an input operation;
    changing a parameter defined with respect to the appearance of the player object in response to motions of the player object including the first motion; and
    changing the appearance of the player object when the player object has performed the special motion,
    wherein causing the player object to perform the special motion comprises causing the player object to perform the special motion when the parameter defined with respect to the appearance of the player object is greater than or equal to a threshold, and
    wherein changing the appearance of the player object comprises:
        changing, when the player object has performed the special motion, the parameter in response to the special motion, and
        changing the appearance of the player object in accordance with the parameter.

2. The non-transitory computer readable medium according to claim 1, wherein the parameter is changed depending on each motion of the player object.

3. The non-transitory computer readable medium according to claim 1, wherein:
    the parameter includes a plurality of parameters defined individually with respect to a plurality of regions of the appearance of the player object, and
    each of the plurality of parameters is changed when a motion regarding a corresponding region of the plurality of regions has been performed.

4. The non-transitory computer readable medium according to claim 2, wherein:
    the parameter includes a plurality of parameters defined individually with respect to a plurality of regions of the appearance of the player object, and
    each of the plurality of parameters is changed when a motion regarding a corresponding region of the plurality of regions has been performed.

5. The non-transitory computer readable medium according to claim 1, the program further causing the computer to execute:

causing the player object to perform a second motion when a second operation that is different from the first operation has been input,
wherein causing the player object to perform the special motion includes causing the player object to perform the special motion along with the second motion.

6. The non-transitory computer readable medium according to claim 2, the program further causing the computer to execute:
causing the player object to perform a second motion when a second operation that is different from the first operation has been input,
wherein causing the player object to perform the special motion includes causing the player object to perform the special motion along with the second motion.

7. The non-transitory computer readable medium according to claim 3, the program further causing the computer to execute:
causing the player object to perform a second motion when a second operation that is different from the first operation has been input,
wherein causing the player object to perform the special motion includes causing the player object to perform the special motion along with the second motion.

8. The non-transitory computer readable medium according to claim 4, the program further causing the computer to execute:
causing the player object to perform a second motion when a second operation that is different from the first operation has been input,
wherein causing the player object to perform the special motion includes causing the player object to perform the special motion along with the second motion.

9. An information processing method comprising steps of:
displaying a player object on a virtual game space;
causing the player object to perform a first motion when a first operation has been input;
causing the player object to perform a special motion when the player object is not performing the first motion and an appearance of the player object satisfies a predetermined condition, irrespective of an input operation;
changing a parameter defined with respect to the appearance of the player object in response to motions of the player object including the first motion; and
changing the appearance of the player object when the player object has performed the special motion,
wherein causing the player object to perform the special motion comprises causing the player object to perform the special motion when the parameter defined with respect to the appearance of the player object is greater than or equal to a threshold, and
wherein changing the appearance of the player object comprises:
changing, when the player object has performed the special motion, the parameter in response to the special motion, and
changing the appearance of the player object in accordance with the parameter.

10. A game device comprising a computer configured to execute:
displaying a player object on a virtual game space;
causing the player object to perform a first motion when a first operation has been input;
causing the player object to perform a special motion when the player object is not performing the first motion and an appearance of the player object satisfies a predetermined condition, irrespective of an input operation;
changing a parameter defined with respect to the appearance of the player object in response to motions of the player object including the first motion; and
changing the appearance of the player object when the player object has performed the special motion,
wherein causing the player object to perform the special motion comprises causing the player object to perform the special motion when the parameter defined with respect to the appearance of the player object is greater than or equal to a threshold, and
wherein changing the appearance of the player object comprises:
changing, when the player object has performed the special motion, the parameter in response to the special motion, and
changing the appearance of the player object in accordance with the parameter.

* * * * *